United States Patent [19]
Suzuki et al.

[11] Patent Number: 6,008,349
[45] Date of Patent: Dec. 28, 1999

[54] MELAMINE POLYMETAPHOSPHATE AND PROCESS FOR ITS PRODUCTION

[75] Inventors: Keitaro Suzuki, Funabashi; Kouji Shishido; Masuo Shindo, both of Nei-gun, all of Japan

[73] Assignee: Nissan Chemical Industries, Ltd., Tokyo, Japan

[21] Appl. No.: 09/077,882

[22] PCT Filed: May 21, 1997

[86] PCT No.: PCT/JP97/01712

§ 371 Date: Jun. 10, 1998

§ 102(e) Date: Jun. 10, 1998

[87] PCT Pub. No.: WO97/44377

PCT Pub. Date: Nov. 27, 1997

[30] Foreign Application Priority Data

May 22, 1996 [JP] Japan ..................................... 8-127002

[51] Int. Cl.$^6$ ............................. C07D 251/70; C07F 9/22
[52] U.S. Cl. ............................................................ 544/195
[58] Field of Search ............................................... 544/195

[56] References Cited

U.S. PATENT DOCUMENTS

| | | | |
|---|---|---|---|
| 3,920,796 | 11/1975 | Sheridan et al. | 544/195 |
| 4,043,987 | 8/1977 | Jolicoeur et al. | 544/195 |
| 4,950,757 | 8/1990 | Tomko et al. | 544/195 |

FOREIGN PATENT DOCUMENTS

| | | |
|---|---|---|
| 0049763 | 4/1982 | European Pat. Off. . |
| 2351886 | 4/1974 | Germany . |
| 61-126091 | 6/1986 | Japan . |

*Primary Examiner*—John M. Ford
*Attorney, Agent, or Firm*—Oblon, Spivak, McClelland, Maier & Neustadt, P.C.

[57] ABSTRACT

A melamine polymetaphosphate having a solubility of from 0.01 to 0.10 g/100 ml in water at 25° C., a pH of from 2.5 to 4.5 in the form of a 10 wt % aqueous slurry at 25° C. and a melamine content of from 1.0 to 1.1 mol per mol of phosphorus atom.

A process for producing such a melamine polymetaphosphate, which comprises the following steps (a) and (b):

(a) a step of mixing melamine, urea and an aqueous orthophosphoric acid solution containing at least 40 wt % of orthophosphoric acid, in such a ratio that melamine is from 1.0 to 1.5 mol per mol of orthophosphoric acid and urea is from 0.1 to 1.5 mol per mol of orthophosphoric acid, at a temperature of from 0 to 140° C., to form a reaction mixture, and stirring the reaction mixture at a temperature of from 0 to 140° C., while removing water, to obtain a powdery product of a double salt of orthophosphoric acid with melamine and urea; and (b) a step of calcining the powdery product obtained in step (a) at a temperature of from 240 to 340° C. for from 0.1 to 30 hours, while preventing agglomeration, to obtain a melamine polymetaphosphate.

4 Claims, 2 Drawing Sheets

MELAMINE POLYMETAPHOSPHATE AND PROCESS FOR ITS PRODUCTION

This is a 371 of PCT/JP97/01712 filed May 21, 1997.

TECHNICAL FIELD

The present invention relates to a melamine polymetaphosphate and a process for its production.

BACKGROUND ART

With respect to melamine polyphosphate, various types of melamine polyphosphate compounds are disclosed in literatures. For example, JP-B-40-28594 discloses a process which comprises calcining melamine orthophosphate at a temperature of from 180 to 250° C. to obtain a calcined melamine phosphate wherein a part of melamine orthophosphate remains. However, it has been pointed out that this melamine phosphate is a composite of melamine orthophosphate and melamine pyrophosphate and does not have adequate water resistance.

U.S. Pat. No. 3,920,796 discloses that melamine pyrophosphate is formed by calcining melamine orthophosphate at a temperature of from 170 to 325° C.

Further, U.S. Pat. No. 4,950,757 discloses a process for producing melamine pyrophosphate, which comprises reacting pyrophosphoric acid and melamine in an aqueous medium at a temperature of from 0 to 60° C.

JP-A-61-126091 discloses a process for producing melamine condensed phosphate, which comprises subjecting condensed phosphoric acid and melamine to a solid phase reaction substantially in the absence of an aqueous medium at a temperature of from naturally generated temperature to 170° C.

It is known to employ urea as a condensing agent for the production of a polyphosphate. For example, JP-B-53-2170 discloses a process for producing an amide polyphosphate containing amide-type nitrogen, wherein a phosphoric acid source, such as ammonium orthophosphate, orthophosphoric acid, condensed phosphoric acid, phosphoric anhydride, urea phosphate or a mixture thereof, and a nitrogen source, such as melamine, a cyanamide derivative such as dicyan cyanamide, guanidine or guanyl urea, or a mixture thereof, are subjected to a heat condensation reaction in the presence of a condensing agent, such as urea, urea phosphate or a mixture thereof. With respect to the production conditions, it is disclosed that heat condensation is carried out at a molar ratio of urea/phosphoric acid (as $H_3PO_4$)/cyanamide derivative=0.8 to 1.5/1/0.05 to 1 in an atmosphere of ammonia gas at a temperature of from 150 to 350° C. for from 10 minutes to 5 hours, preferably from 1 to 4 hours. Example 1 of the same publication discloses that ammonium phosphate, industrial urea and melamine were mixed at a molar ratio of urea/phosphoric acid (as $H_3PO_4$)/melamine=1/1/0.5 to obtain a material for calcination, which was subjected to heat condensation at a temperature of from 240 to 260° C. for 2.5 hours to obtain a substantially water-insoluble amide polyphosphate (nitrogen: 33.48 wt %, diphosphorus pentoxide: 44.73 wt %, elution ratio (10 g of a sample was put into 100 ml of water and stirred for 1 hour at a predetermined temperature, whereupon the elution ratio (%) was determined): 1.36%, pH of the 1% solution: 8.26).

JP-B-53-15478 discloses a process for producing an ammonium polyphosphate hardly soluble in water, which comprises calcining crystalline urea phosphate, or ammonium phosphate and urea, as starting material, wherein the starting material is heat-condensed in the presence of melamine or melamine phosphate in an amount of from 5 to 50 wt % as melamine (based on the total amount of the starting material and melamine or melamine phosphate) to obtain a modified ammonium polyphosphate. Example 1 of the same publication discloses that a starting material prepared by mixing ammonium phosphate, industrial urea and melamine at a molar ratio of urea/phosphoric acid (as $H_3PO_4$)/melamine=1/1/0.5, was subjected to heat condensation by a rotary indirect heating furnace at a temperature of from 260 to 270° C. for 1.5 hours to obtain a product, then the product was pulverized to a particle size whereby all particles pass through 32 mesh (standard sieve) and then subjected to heat condensation by a rotary indirect heating furnace in an ammonia gas atmosphere at 270° C. for 1.5 hours to obtain a substantially water-insoluble modified ammonium polyphosphate (total nitrogen: 34.52 wt %, ammonia type nitrogen: 8.15 wt %, diphosphorus pentoxide: 44.03 wt %, elution ratio (10 g of a sample was put into 100 ml of water and stirred for 1 hour at a temperature of 25° C., whereupon the elution ratio (%) was determined): 0.31%, pH of the 1% solution: 7.60).

JP-B-55-49004 discloses a process for producing a mixture of a hardly soluble ammonium polyphosphate and melamine, which comprises a solid phase reaction by heating a mixture of melamine phosphate and urea at a temperature of at least 240° C. Example 2 of the same publication discloses a mixture of a hardly soluble ammonium polyphosphate and melamine (phosphorus: 14.5%, water-solubility (10 g of a sample was put into 100 ml of water, followed by shaking at room temperature for 30 minutes, whereupon the elution ratio (%) was determined): 4.8%), which was obtained by using 10 kg of melamine phosphate and 6 kg of urea (1.5 mol of urea per mol of phosphoric acid).

U.S. Pat. No. 4,043,987 discloses a process for producing an ammonium melamine polyphosphate as a salt of a substituted ammonium polyphosphate. Example 1 of the same patent discloses that while stirring 100 g of condensed phosphoric acid, 47 g of urea was added thereto, then 8 g of melamine was added to the mixture, and the entire amount was calcined at 240° C. for 30 minutes to obtain an ammonium melamine polyphosphate as a foam solid (solubility in water at 25° C.: 5.4 g/100 ml, pH of the 10 wt % aqueous slurry at 25° C.: 5.68). The remaining foam solid was pulverized, and the pulverized product was heat-treated by a metal pressure container under a pressure of $4\times10^5$ Pa at a temperature of 170° C. for 13 hours to obtain a pulverized product (carbon: 4%, nitrogen: 18%, phosphorus: 29%, solubility in water at 25° C.: 3.92 g/100 ml, pH of the 10 wt % aqueous slurry at 25° C.: 6.63).

On the other hand, it is well known to utilize a melamine polyphosphate as a flame retardant, and many proposals have been made heretofore. For example, JP-A-53-49054 discloses a polyamide resin composition having improved flame retardancy, which is prepared by adding an inorganic filler and melamine phosphate to a polyamide.

JP-A-61-126091 discloses that condensed melamine phosphate is useful as a flame retardant for a thermoplastic resin such as polyester, polyamide or polyolefin, for a thermosetting resin such as a phenol or urethane epoxy resin, or for a cellulose material.

Further, JP-A-7-316415 discloses a flame retardant polyphenylene ether resin composition, which is prepared by adding melamine phosphate to a polyphenylene ether resin composition.

Each of melamine orthophosphate, melamine pyrophosphate and calcined melamine phosphate disclosed in the above-described prior art has a large water content and no adequate heat stability and thus has a drawback that dissociation of water and melamine is remarkable before the heating temperature reaches 300° C. and a drawback that the content of water-soluble components is high. The above-described condensed melamine phosphate is improved in that dissociation of water and ammonia due to heating at a temperature of 300° C. is little, but still has a drawback that the content of water-soluble components is high. Accordingly, although such melamine orthophosphate and melamine polyphosphates are effective as flame retardants for cellulose materials or resins having low molding temperatures, they can be hardly effectively used as flame retardants for resins having high molding temperatures, with which resin temperatures become 300° C. even temporarily.

Further, the above-mentioned amide polyphosphate prepared by using urea as a condensing agent, the mixture of ammonium polyphosphate and melamine, or the ammonium melamine polyphosphate, is improved in that dissociation of water by heating at a temperature of 300° C. is little, but undergoes thermal decomposition and dissociation of ammonia. Further, most of them have a drawback that the content of water-soluble components is high. Accordingly, they may be effective as flame retardants for cellulose materials or resins having low molding temperatures, but can be hardly effectively used as flame retardants for resins having high molding temperatures, with which the resin temperatures become 300° C. even temporarily.

DISCLOSURE OF THE INVENTION

Under these circumstances, it is an object of the present invention to overcome the drawbacks of the prior art and to provide a melamine polymetaphosphate which is widely useful as a flame retardant and a process for its production.

The present invention provides a melamine polymetaphosphate having a solubility of from 0.01 to 0.10 g/100 ml in water at 25° C., a pH of from 2.5 to 4.5 in the form of a 10 wt % aqueous slurry at 25° C. and a melamine content of from 1.0 to 1.1 mol per mol of phosphorus atom.

The present invention also provides a process for producing such a melamine polymetaphosphate, which comprises the following steps (a) and (b):

(a) a step of mixing melamine, urea and an aqueous orthophosphoric acid solution containing at least 40 wt % of orthophosphoric acid, in such a ratio that melamine is from 1.0 to 1.5 mol per mol of orthophosphoric acid and urea is from 0.1 to 1.5 mol per mol of orthophosphoric acid, at a temperature of from 0 to 140° C., to form a reaction mixture, and stirring the reaction mixture at a temperature of from 0 to 140° C., while removing water, to obtain a powdery product of a double salt of orthophosphoric acid with melamine and urea; and (b) a step of calcining the powdery product obtained in step (a) at a temperature of from 240 to 340° C. for from 0.1 to 30 hours, while preventing agglomeration, to obtain a melamine polymetaphosphate.

Further, as an improvement of the above process of the present invention, step (b) is modified by incorporating colloidal silica to the powdery product obtained in step (a) in an amount of at most 16 parts by weight of the colloidal silica per 100 parts by weight of the melamine content of the powdery product, prior to the calcination.

Figure 1:
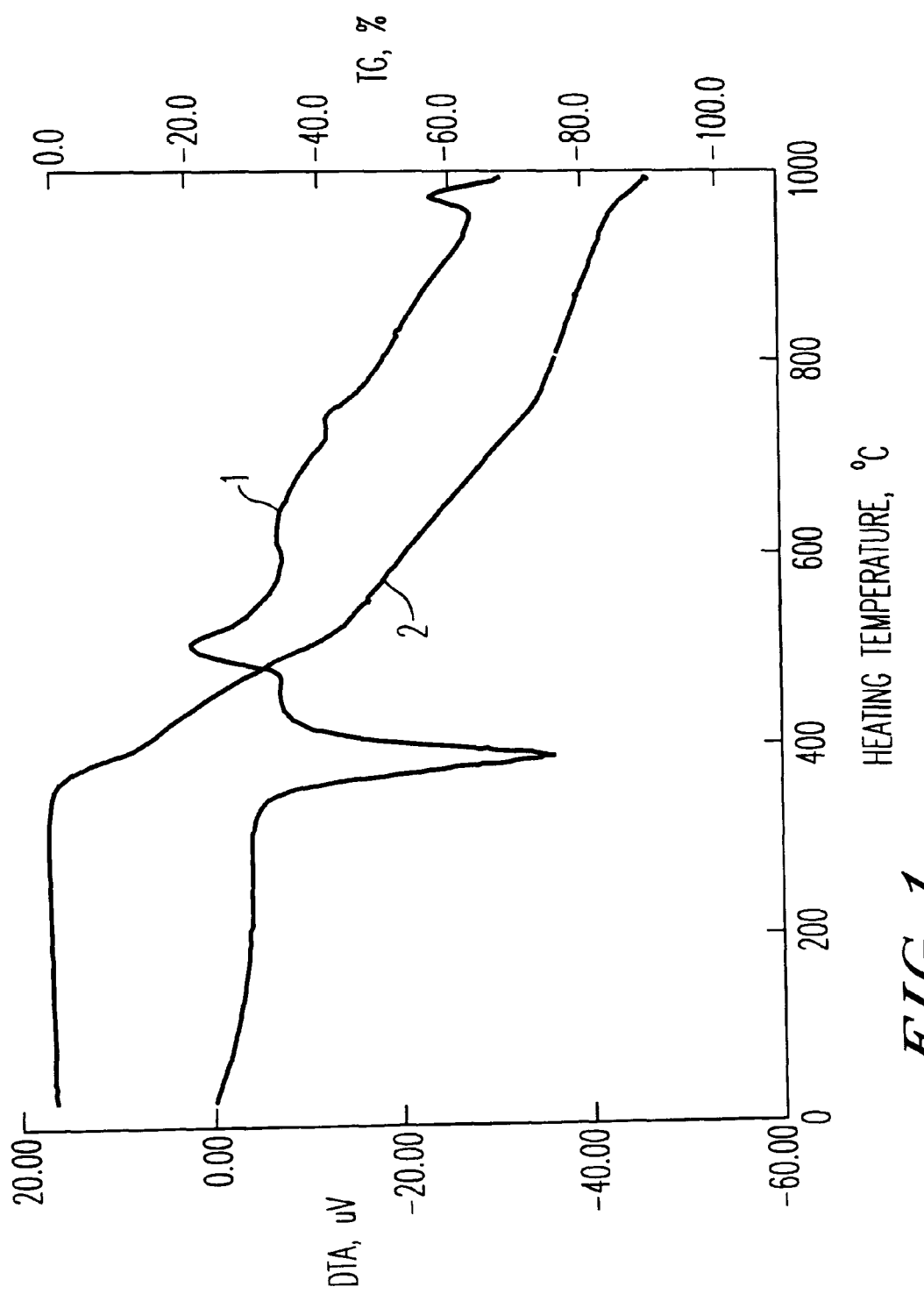
FIG. 1 is a thermogram of a mixture of melamine polymetaphosphate and colloidal silica obtained in Example 4 (a product pulverized by a pin-type mill). Line 1 is a line of DTA. Line 2 is a line of TG.

Now, the present invention will be described in detail with reference to the preferred embodiments.

The melamine polymetaphosphate of the present invention is a melamine salt of a long-chain polyphosphoric acid represented by the formula (1):

$$(MHPO_3)_n \tag{1}$$

wherein M is melamine, H is a hydrogen atom, P is a phosphorus atom, O is an oxygen atom, and n is an integer and wherein the degree (n) of polymerization of a melamine salt of linear phosphoric acid is large.

Here, melamine is represented by the formula (2):

$$C_3N_6H_6 \tag{2}$$

The melamine polymetaphosphate of the present invention has a solubility of from 0.01 to 0.10 g/100 ml in water at 25° C. In analyses of the same sample, even if the ratio of the solute to the solvent is varied as a dissolving condition, substantially the same value is obtainable for the solubility. Further, even if the sample is thoroughly washed with water and dried, and thereafter the solubility is measured, substantially the same value as prior to such treatment can be obtained. On the other hand, conventional melamine polyphosphates and ammonium melamine polyphosphates have solubilities exceeding 0.10 g/100 ml in water at 25° C. in most cases, either because the solubilities of such compounds are large, or the content of water-soluble components is large.

A 10 wt % aqueous slurry (at 250° C.) of the melamine polymetaphosphate of the present invention has a pH of from 2.5 to 4.5. On the other hand, solutions of conventional ammonium melamine polyphosphates are disclosed to have a pH of from 5.0 to 9.0.

In the composition of the melamine polymetaphosphate of the present invention, the ratio of melamine is from 1.0 to 1.1 mol per gram atom of phosphorus, as the ratio of oxygen atom is substantially 3.0 gram atom per gram atom of phosphorus, the ratio of nitrogen atom is substantially 2.0 gram atom per gram atom of carbon atom, and the ratio of carbon atom is from 3.0 to 3.3 gram atom per gram atom of phosphorus. If an attention is drawn to nitrogen atom, the ratio of nitrogen atom is from 6.0 to 6.6 per gram atom of phosphorus. On the other hand, in conventional melamine polyphosphates and ammonium melamine polyphosphates, the ratio of nitrogen atom is disclosed to be from 1.4 to 4.5 gram atom per gram atom of phosphorus atom.

The melamine polymetaphosphate of the present invention shows excellent heat resistance, such that no weight reduction is observed up to 350° C. from the results of the differential thermal analysis. Further, from the results of the powder X-ray diffraction analysis, the melamine polymetaphosphate of the present invention is confirmed to be a crystalline substance. Further, from the diffraction peaks, no peaks attributable to melamine orthophosphate, melamine pyrophosphate and melamine, are observed.

Melamine, urea and an aqueous orthophosphoric acid solution to be used in the present invention may be those which are commercially available. The aqueous orthophosphoric acid solution may be of a thermal process type or of a wet process type, so long as the concentration of orthophosphoric acid is at least 40 wt %. The higher the concentration, the better. Particularly preferred is an aqueous thermal process type orthophosphoric acid solution having an orthophosphoric acid concentration of from 75 to 89 wt %. With an aqueous orthophosphoric acid having a concentration of less than 40 wt %, water tends to be too high in step (a), and it takes too much time for drying after the mixing reaction, such being undesirable.

The urea may be either granular urea or powdery urea.

In the present invention, for the reaction in step (a), a mixing and stirring apparatus, such as an automatic mortar, a versatile mixer, a Henschel mixer or a homogenizer, may be employed.

In step (a), remarkable heat generation takes place when the melamine, the urea and the aqueous orthophosphoric acid solution are mixed. Accordingly, when the orthophosphoric acid concentration in the aqueous orthophosphoric acid used, is high, water containing in the aqueous orthophosphoric acid solution will evaporate, whereby the product will be a wet or dry powder. On the other hand, when the concentration of orthophosphoric acid is low, heating is required during mixing and stirring of the mixture, to increase the amount of evaporated water, to obtain the desired wet or dry powder product. The mixing and stirring apparatus is preferably a Henschel mixer having a shearing force, whereby the reaction can be uniformly carried out.

In step (a) of the present invention, it is preferred to use melamine at a ratio of from 1.0 to 1.5 mol per mol of orthophosphoric acid and urea at a ratio of from 0.1 to 1.5 mol per mol of orthophosphoric acid.

In the present invention, the mixing ratio of melamine to orthophosphoric acid may basically be at a ratio of 1.0 mol of melamine to 1 mol of orthophosphoric acid. However, in step (b), melamine decreases due to sublimation. Accordingly, it is preferred to preliminarily incorporate melamine in an excess amount in step (a). Melamine may be in an amount of more than 1.5 mol per mol of orthophosphoric acid. However, if it exceeds 1.5, sublimation of melamine increases, whereby the environment tends to deteriorate, such being undesirable. Melamine is particularly preferably in an amount of from 1.02 to 1.30 mol per mol of orthophosphoric acid. It is particularly preferred that melamine is preliminarily added to an aqueous orthophosphoric acid solution in an amount of at most 0.15 mol, preferably from 0.05 to 0.15 mol, of melamine per mol of orthophosphoric acid, and dissolved under heating, and such a solution is used for step (a), whereby the reaction can further be made uniform to obtain a uniform product. In the present invention, urea facilitates dehydration condensation of orthophosphoric acid in step (b) and thus plays an important role for formation of the melamine polymetaphosphate. If urea is in an amount of less than 0.1 mol per mol of orthophosphoric acid, such an effect tends to be small, and decomposition of melamine tends to occur, such being undesirable. On the other hand, if it exceeds 1.5 mol, excessive urea remains, whereby generation of ammonia gas increases in step (b), whereby sublimation of melamine will be facilitated, such being undesirable. With a view to preventing decomposition of melamine and decomposition of excessive urea, it is more preferably from 0.3 to 0.7 mol per mol of orthophosphoric acid.

In step (a) of the present invention, the temperature at the time of mixing and stirring melamine, urea and the aqueous orthophosphoric acid solution, may be from 0 to 140° C. However, it is preferably from 80 to 110° C. in order to efficiently carry out the removal of water. The total time for mixing and stirring is usually from 10 minutes to 2 hours, although it depends on the intensity of mixing. Further, mixing of melamine, urea and the aqueous orthophosphoric acid solution is an exothermic reaction. Therefore, it is preferred that melamine and urea are preliminarily mixed, and then the aqueous orthophosphoric acid solution is added and mixed over an extended period of time.

In step (a) of the present invention, orthophosphoric acid will react with melamine and urea by mixing to form a double salt as a compound of orthophosphoric acid with melamine and urea. The composition is not specifically determined. However, the total molar amount of melamine and urea is about 1.1 mol per mol of orthophosphoric acid, and there exist compounds wherein melamine is 1 mol and 2 mol per mol of orthophosphoric acid and compounds wherein urea is 1 mol and 3 mol per mol of orthophosphoric acid. Therefore, the double salt is considered to have a total molar amount of melamine and urea of at least 1 mol per mol of orthophosphoric acid. The product obtainable in step (a) is a wet powdery product or a dry powdery product composed of a mixture of this double salt and excess urea.

In step (a) of the present invention, colloidal silica may be added preliminarily in step (a) to incorporate colloidal silica to the powdery product at a ratio of at most 16 parts by weight of colloidal silica per 100 parts by weight of the melamine content in the powdery product obtained in step (a). When the application as a flame retardant is taken into account, the amount of colloidal silica to be added in step (a) is at most 16 parts by weight of colloidal silica per 100 parts by weight of melamine in order to avoid deterioration of the flame retarding effect, since colloidal silica itself has no flame retarding effect. A preferred amount of colloidal silica is from 0.5 to 10 parts by weight of colloidal silica per 100 parts by weight of melamine. The addition of colloidal silica in step (a) serves to facilitate formation of the double salt more uniformly by mixing and stirring of melamine, urea and orthophosphoric acid. Colloidal silica is an inert substance in this reaction for a double salt.

In step (b) of the present invention, the product obtained in step (a) is calcined at a calcination temperature of from 240 to 340° C. for from 0.1 to 30 hours to obtain a melamine polymetaphosphate. It is surprising that in step (b) of the present invention, a melamine polymetaphosphate can be formed at a low temperature of 240° C. where melamine pyrophosphate usually forms, although it will be formed via melamine pyrophosphate. This may be explained such that by calcination, urea dissociates upon decomposition from a double salt of orthophosphoric acid with melamine and urea obtained in step (a), and due to the dehydration condensation acceleration effect of the urea, formed polymetaphosphoric acid is firmly re-united with melamine to form melamine polymetaphosphate. If the temperature is lower than 240° C., it is impossible to obtain the melamine polymetaphosphate, and if it exceeds 340° C., dissociation of melamine from the melamine polymetaphosphate tends to be substantial, such being undesirable. The temperature is particularly preferably from 260 to 320° C., whereby dissociation of melamine is suppressed.

If the calcination time in step (b) of the present invention is less than 0.1 hour, formation of the melamine polyphosphate tends to be inadequate. The calcination time may be longer than 30 hours, but such is not economical.

For the calcination in step (b) of the present invention, it is possible to employ an electric furnace, a tray drier, a rotary kiln, a double-shaft type continuous screw conveyor kiln, and a fluidized bed kiln, alone or in combination. In step (b), agglomeration of the powder is likely to occur by dehydration, or a gas is likely to be generated by decomposition of urea or sublimation of melamine. Accordingly, it is preferred to employ a calcination furnace of a type which is capable of stirring during the calcination. As such a preferred calcination furnace, a double-shaft type continuous screw conveyor kiln may be mentioned. It is more preferred that after calcination by a double-shaft type continuous screw conveyor kiln, calcination is carried out by a fluidized-bed kiln.

Colloidal silica is amorphous silica of which primary particles have colloidal dimensions. When colloidal silica is incorporated to the powder product in step (b) of the present invention, adhesion of the melamine polymetaphosphate to the calcination apparatus during calcination can be prevented, and corrosion can also be suppressed. Such incorporation is also effective to improve the powder properties such as dispersibility and flowability of the melamine polymetaphosphate. The colloidal silica may, for example, be precipitated silica, pyrogenic silica or colloidal silica as a dispersoid of aqueous silica sol, and the one having a primary particle size of at most 100 nm is preferred. The one having a primary particle size of from 8 to 50 nm is more preferred, is more preferred, since such colloidal silica is readily available. The colloidal silica may not necessarily be preliminarily added in step (a). Namely, the colloidal silica may be incorporated to the powdery product in step (b). The amount of the colloidal silica to be added in step (b) is at most 16 parts by weight of colloidal silica per 100 parts by weight of the melamine content in the powdery product obtained in step (a) to avoid deterioration of the flame retardant effect, since the colloidal silica itself has no flame retarding effect. A preferred amount of the colloidal silica to be added is from 0.5 to 10 parts by weight per 100 parts by weight of the melamine content in the powdery product obtained in step (a).

Such a calcined product may be dry-pulverized by a mixer, a pin-type mill, a ball mill or a Jet-O-Mizer (jet mill), as the case requires, to obtain fine powder having an average particle size (median diameter) of at most 20 $\mu$m, more preferably at most 10 $\mu$m, suitable for use as a flame retardant.

Further, as a flame retardant, it is possible to use not only the above-mentioned pulverized product of the calcined product obtained in step (b) of the present invention, but also a pulverized product prepared by adding at most 25 parts by weight of an inorganic and/or organic basic substance, per 100 parts by weight of the calcined product obtained in step (b) of the present invention. The addition may be carried out at a temperature of from room temperature to 340° C. Namely, the addition may be made prior to completion of the calcination in step (b) or may be made to the product cooled after completion of the calcination. For this addition, it is preferred to employ a mixing apparatus having a shearing force, such as a Henschel mixer, a homogenizer or a homomixer. However, a method may be employed wherein after mixing by a V-type blender or a versatile mixer, the mixture is treated by a pulverization apparatus such as a Jet-O-Mizer, a pin-type mill or a ball mill. Also in this case, the mixture can be pulverized to fine powder having an average particle size of at most 20 $\mu$m, preferably at most 10 $\mu$m. Further, after mixing at room temperature, the mixture may be re-calcined at a temperature of from 240 to 340° C.

Here, the inorganic and/or organic basic substance is a substance having a basic nature capable of reacting with phosphoric acid and being insoluble or hardly soluble in water. For example, preferred is an inorganic substance such as magnesium hydroxide, aluminum hydroxide, calcium hydroxide, calcium silicate, magnesium silicate, calcium carbonate or zinc oxide, or an organic substance such as melamine, N-alkylmelamine or other melamine derivatives, melem, melone, a melamine resin, an amide resin, an amino-type silane coupling agent, a phenol resin or an amine. Such an inorganic and/or organic basic substance may be the one which is commercially available.

The calcined product obtained in step (b) of the present invention is basically a melamine polymetaphosphate and shows acidity. However, in the case of a mixture having an inorganic and/or organic basic substance incorporated, the calcined product will be weakly acidic or weakly alkaline and shows a pH of from 5 to 9, as it is neutralized with the basic substance.

In the present invention, methods for evaluating test samples are as follows. Here, as test samples, products pulverized by a pin-type mill were used.

(1) Elemental Analysis
(i) Carbon, Nitrogen and Hydrogen
Measured by an apparatus for elemental analysis, 2400 CHN elemental analyzer, manufactured by Perkin-Elmer Corp.
(ii) Phosphorus
Measured by vanadomolybdophosphate absorptiometry.
(2) Analysis of Silica (Silicon Oxide: $SiO_2$) Content
Measured by means of a fluorescent X-ray analyzer, SEA2001L, manufactured by Seiko Instruments & Electronics, Ltd.
(3) Differential Thermal Analysis
Measured by means of a differential thermal analyzer, TG/DTA320U, manufactured by Seiko Instruments & Electronics, Ltd.
Measuring Conditions
    Test sample 11 mg, reference: $\alpha$-alumina 11 mg,
    Temperature range for measurement: 25 to 1,000° C.
    Temperature raising rate: 10° C./min
(4) Powder X-ray Diffraction
Measured by means of an X-ray diffraction apparatus JEOL JDX-8200T, manufactured by JEOL Ltd. (counter anode: Cu-K$\alpha$)
(5) Bulk Density (Loose Apparent Density)
Measured by Powder Tester, manufactured by Hosokawa Micron Corp.
(6) Average Particle Size
The 50% volume diameter (median diameter) was taken as the average particle size.
The 50% volume diameter (median diameter) was measured by a centrifugal sedimentation particle measuring apparatus SA-CP3, manufactured by Shimadzu Corp.
Measuring Conditions
    Solvent: pure water (25° C.).
(7) pH of 10 wt % Aqueous Slurry (25° C.)
25 g of a test sample was introduced into a 300 ml beaker, and then 225 g of pure water (25° C.) measured by a measuring cylinder, was added thereto. Then, a magnetic stirrer was put into the beaker, followed by stirring for 30 minutes with the magnetic stirrer to obtain a 10 wt % aqueous slurry.

Then, the pH of the 10 wt % aqueous slurry was measured by means of a pH meter M-8AD, manufactured by Horiba, Ltd.
(8) Solubility in Water at 25° C.
5.00 g (ag) of a test sample was accurately weighed and put into a 300 ml beaker. Then, 250 ml of pure water (25° C.) measured by a measuring cylinder was added thereto. Then, a magnetic stirrer was put into the beaker at a constant temperature (25° C.), followed by stirring for 30 minutes with the magnetic stirrer, to obtain a slurry. With a No. 5A filter paper preliminarily dried and accurately weighed, the prepared slurry was subjected to suction filtration. After completion of the filtration, the filtrate was taken into a separate container, and the slurry remaining in the beaker used for the preparation of the slurry was washed with the filtrate and transferred to the No. 5A filter paper used for the previous filtration and having a non-dissolved sample attached thereon. Thus, the non-dissolved sample was recovered on the No. 5A filter paper substantially in its entire amount.

Then, into a Petri dish accurately weighed, the No. 5A filter paper having the non-dissolved sample recovered thereon, was put. The Petri dish was introduced into a tray drier which was preliminarily heated to 80° C. and dried for 5 hours. Then, the Petri dish was immediately put into a desiccator and left to cool.

Then, the total weight was measured, and the weight (bg) of the non-dissolved sample was calculated by deducting the weights of the No. 5A filter paper and the Petri dish from the total amount.

The solubility (g/100 ml) was obtained by a calculation formula 100·(a–b)/250.

The method for measuring the solubility in water at 30° C. was carried out in the same manner as the above measuring method except that the liquid temperature of the above pure water was changed to 30° C., and the filtration operation was carried out at a constant temperature of 30° C.

BEST MODE FOR CARRYING OUT THE INVENTION

Now, the present invention will be described in further detail with reference to Examples. However, it should be understood that the present invention is by no means restricted to such specific Examples.

EXAMPLE 1

Step (a)

Into a 5 l versatile mixer (made of stainless steel), 620 g (4.92 mol) of melamine (manufactured by Nissan Chemical Industries, Ltd.) and 135 g (2.25 mol) of industrial granular urea (manufactured by Nissan Chemical Industries, Ltd.) were taken and mixed for 10 minutes. To this mixture of melamine and urea, 443 g (orthophosphoric acid content: 3.84 mol) of an aqueous orthophosphoric acid solution containing 85 wt % of orthophosphoric acid (manufactured by TOSOH Corp.) was added and mixed for 30 minutes with stirring. After completion of the addition, stirring was further continued for 30 minutes. The ratio of melamine was 1.28 mol per mol of orthophosphoric acid. By the addition of this aqueous orthophosphoric acid solution, remarkable heat-generation took place, and steam was generated, whereby 1,185 g of a wet powdery product was obtained.

Step (b)

The entire amount of 1,185 g of the product obtained in step (a) was put into a stainless steel vat and calcined at 310° C. by an electric furnace. The temperature raising time was about 4 hours, whereupon the temperature became 310° C., and the calcining temperature of 310° C. was maintained for 5 hours. Slight agglomeration occurred due to dehydration, and to prevent agglomeration, the product was taken out when the temperature reached 150° C. and the product in an agglomerated state was disintegrated, whereupon the calcination was continued. By the calcination, decomposition of urea and sublimation of melamine were distinctly observed. 768 g (theoretical amount: 791 g) of the calcined product was obtained. After cooling, this calcined product was pulverized by a pin-type mill.

The obtained pulverized product of the calcined product had powder properties such that the bulk density was 0.6 g/ml, and the average particle size was 8.2 μm.

With respect to the obtained calcined product, the results of the elemental analysis and the theoretical values of the melamine polymetaphosphate were compared, whereby carbon was 17.4 wt % (theoretical value: 17.5 wt %), nitrogen was 40.5 wt % (theoretical value: 40.8 wt %), hydrogen was 5.5 wt % (theoretical value: 3.4 wt %), and phosphorus was 14.8 wt % (theoretical value: 15.0 wt %). Further, from these results, oxygen in the calcined product was calculated to be 21.8 wt %, and the ratio of oxygen atom was 2.85 mol per mol of phosphorus atom, which substantially agreed to the ratio (theoretical value) of oxygen atom being 3.0 mol per mol of phosphorus atom of the polymetaphosphoric acid. The ratio of nitrogen atom was 2.00 mol per mol of carbon atom in the calcined product, which agreed to the ratio of nitrogen atom (theoretical value) being 2.0 mol per mol of carbon atom of melamine. Further, the ratio of carbon atom was 3.04 mol per mol of phosphorus atom, and the ratio of melamine was accordingly 1.01 mol per mol of phosphorus atom.

As a result of the differential thermal analysis, with the obtained product, no substantial weight loss was observed up to 350° C., thus indicating excellent heat resistance.

The calcined product was crystalline, and as a result of the powder x-ray diffraction, no diffraction peak attributable to melamine orthophosphate, melamine pyrophosphate or melamine was observed among the diffraction peaks.

Further, it had a pH of 3.09 in the form of a 10 wt % aqueous slurry at 25° C. Further, the solubility in water at 25° C. was as small as 0.03 g/100 ml, and the solubility in water at 30° C. was as small as 0.04 g/100 ml.

Further, for evaluation of the solubility characteristics, the solubility was measured by changing the measurement conditions.

(1) Change in the Amount of the Solvent

In the method for measuring the solubility in water at 25° C., as described above, 250 ml of pure water (25° C.) as the solvent was changed to 500 ml of pure water (25° C.), and the measurement was carried out. The solubility in that water at 25° C. was 0.02 g/100 ml, which is substantially the same as the value obtained by the above-described method.

(2) Pretreatment of the Test Sample for Measurement 25 g of the above product pulverized by a pin-type mill was taken into a 2,000 ml beaker, and 1,500 ml of pure water (25° C.) was added, followed by dispersing for 30 minutes. The obtained dispersion was subjected to filtration with a No. 5A filter paper, and the non-dissolved substance was washed with 6,000 ml of pure water (25° C.) and then separated by filtration. The separated non-dissolved substance was dried at 110° C. to obtain a water-washing treated test sample. With respect to the obtained water-washing treated test sample, the solubility in water at 25° C. was 0.03 g/100 ml. Thus, it was confirmed that the solubilities obtained before and after the water washing treatment were the same.

From the foregoing results, the calcined product obtained in step (b) was determined to be a melamine polymetaphosphate. The obtained calcined product is considered to be a melamine polymetaphosphate having a high purity.

Comparative Example 1

The experiment was carried out in the same manner as in Example 1 except that in step (a), the amount of melamine was changed to 774 g (6.14 mol).

892 g (theoretical amount: 791 g) of the calcined product was obtained. After cooling, this calcined product was pulverized by a pin-type mill.

The obtained pulverized product of the calcined product had powder properties such that the bulk density was 0.6 g/ml and the average particle size was 8.5 μm.

With respect to the obtained calcined product, the elemental analysis was carried out, and the results were such that carbon was 19.3 wt %, nitrogen was 43.5 wt %, hydrogen was 4.0 wt %, and phosphorus was 13.2 wt %. Further, from these results, oxygen in the calcined product was calculated to be 20.0 wt %, and the ratio of oxygen atom was 2.94 mol per mol of phosphorus atom, which substantially agreed to the ratio (theoretical value) of oxygen atom being 3.0 mol per mol of phosphorus atom in polymetaphosphoric acid. The ratio of nitrogen atom was 1.93 mol per mol of carbon atom in the calcined product, which substantially agreed to the ratio of nitrogen atom (theoretical value) being 2.0 mol per mol of carbon atom of melamine. However, the ratio of carbon atom was 3.78 mol per mol of phosphorus atom, and accordingly, the ratio of melamine was 1.26 mol per mol of phosphorus atom. Thus, the obtained calcined product contained a melamine polymetaphosphate and melamine.

The product had a pH of 4.63 in the form of a 10 wt % aqueous slurry at 25° C.

Comparative Example 2

The experiment was carried out in the same manner as in Example 1 except that in step (a), the amount of industrial granular urea was changed to 11.5 g (0.19 mol).

734 g (theoretical amount: 791 g) of the calcined product was obtained. After cooling, this calcined product was pulverized by a pin-type mill.

The obtained pulverized product of the calcined product had powder properties such that the bulk density was 0.6 g/ml and the average particle size was 8.7 μm.

With respect to the obtained calcined product, the elemental analysis was carried out, and the results were such that carbon was 16.9 wt %, nitrogen was 40.0 wt %, hydrogen was 3.7 wt %, and phosphorus was 15.9 wt %. Further, from these results, oxygen in the calcined product was calculated to be 23.5 wt %, and the proportion of oxygen atom was 2.86 mol per mol of phosphorus atom, which substantially agreed to the ratio (theoretical value) of oxygen atom being 3.0 mol per mol of phosphorus atom of polymetaphosphoric acid. The ratio of nitrogen atom was 2.03 mol per mol of carbon atom in the calcined product, which substantially agreed to the ratio (theoretical value) of nitrogen atom being 2.0 mol per mol of carbon atom of melamine. However, the ratio of carbon atom was 2.75 mol per mol of phosphorus atom, and accordingly, the ratio of melamine was 0.92 mol per mol of phosphorus atom. Thus, the obtained calcined product contained a melamine polymetaphosphate and free polymetaphosphoric acid.

It had a pH of 2.40 in the form of a 10 wt % aqueous slurry at 25° C.

Comparative Example 3

The experiment was carried out in the same manner as in Example 1 except that in step (a), the amount of industrial granular urea was changed to 461 g (7.68 mol).

718 g (theoretical amount: 791 g) of the calcined product was obtained. After cooling, this calcined product was pulverized by a pin-type mill.

The obtained pulverized product of the calcined product had powder properties such that the bulk density was 0.6 g/ml and the average particle size was 8.3 μm.

With respect to the obtained calcined product, the elemental analysis was carried out, and the results were such that carbon was 16.7 wt %, nitrogen was 39.6 wt %, hydrogen was 3.7 wt %, and phosphorus was 16.3 wt %. Further, from these results, oxygen in the calcined product was calculated to be 23.7 wt %, and the ratio of oxygen atom was 2.82 mol per mol of phosphorus atom, which substantially agreed with the ratio (theoretical value) of oxygen atom being 3.0 mol per mol of phosphorus atom of polymetaphosphoric acid. The ratio of nitrogen atom was 2.03 mol per mol of carbon atom in the calcined product, which substantially agreed to the ratio (theoretical value) of nitrogen atom being 2.0 mol per mol of carbon atom of melamine. However, the ratio of carbon atom was 2.65 mol per mol of phosphorus atom, and accordingly, the ratio of melamine was 0.88 mol per mol of phosphorus atom. Thus, the obtained calcined product contained a melamine polymetaphosphate and free polymetaphosphoric acid.

It had a pH of 2.23 in the form of a 10 wt % aqueous slurry at 25° C.

EXAMPLE 2

Step (a)

Into a 5 l versatile mixer (made of stainless steel), 540 g (4.29 mol) of melamine (manufactured by Nissan Chemical Industries, Ltd.), 108 g (1.80 mol) of industrial granular urea (manufactured by Nissan Chemical Industries, Ltd.) and 21 g of precipitated silica powder as colloidal silica (Carplex #80, registered trademark, manufactured by Shionogi Co., Ltd., specific surface area: 193 m$^3$/g, silica content: 95 wt %, primary particle size: 10 to 20 nm) were taken and mixed for 10 minutes. To this mixture of melamine, urea and colloidal silica, 443 g (orthophosphoric acid content: 3.84 mol) of an aqueous orthophosphoric acid solution containing 85 wt % of orthophosphoric acid (manufactured by TOSOH Corp.) was added and mixed for a period of 30 minutes with stirring. After completion of the addition, stirring was continued for further 30 minutes. The ratio of melamine was 1.11 mol per mol of orthophosphoric acid. By the addition of this aqueous orthophosphoric acid solution, remarkable heat-generation took place, and steam was generated, whereby 1,100 g of a wet powdery product was obtained.

Step (b)

The entire amount of 1,100 g of the product obtained in step (a) was put into a stainless steel vat and calcined at 310° C. by an electric furnace. The temperature raising time was about 4 hours, whereupon the temperature became 310° C. The calcining temperature of 310° C. was maintained for 5 hours. Slight agglomeration occurred due to dehydration, and in order to prevent such agglomeration, the product was taken out when the calcination temperature reached 150° C., and the product in an agglomerated state was disintegrated, whereupon the calcination was continued. By the calcination, decomposition of urea and sublimation of melamine were remarkably observed. 780 g (theoretical amount: 811 g) of the calcined product was obtained. After cooling, this calcined product was pulverized by a pin-type mill.

The obtained pulverized product of the calcined product had powder properties such that the bulk density was 0.6 g/ml and the average particle size was 7.0 μm.

With respect to the calcined product, the elemental analysis was carried out, and the results were such that the carbon was 17.0 wt %, nitrogen was 39.5 wt %, hydrogen was 5.2 wt %, and phosphorus was 14.4 wt %. The silica content was 2.4 wt % as a result of its analysis. Further, from these results, oxygen in the calcined product was calculated to be 21.5 wt %, and the ratio of oxygen atom was 2.89 mol per mol of phosphorus atom, which substantially agreed to the ratio (theoretical value) of oxygen atom being 3.0 mol per mol of phosphorus atom of polymetaphosphoric acid. The ratio of nitrogen atom was 1.99 mol per mol of carbon atom in the calcined product, which was clearly agreed to the ratio (theoretical value) of nitrogen atom being 2.0 mol per mol of carbon atom of melamine. Further, the ratio of carbon atom was 3.05 mol per mol of phosphorus atom, and accordingly, the ratio of melamine was 1.02 mol per mol of phosphorus atom.

As a result of the differential thermal analysis, with the obtained product, no substantial weight loss was observed up to 350° C., thus indicating excellent heat resistance.

The calcined product was crystalline. As a result of the powder X-ray diffraction, the diffraction peaks agreed to the diffraction peaks in Example 1, and no peak attributable to melamine orthophosphate, melamine pyrophosphate or melamine was observed.

From the foregoing results, the calcined product obtained in step (b) was determined to be a mixture of a melamine polymetaphosphate and colloidal silica.

The obtained calcined product contained 97.6 wt % of melamine polymetaphosphate and 2.4 wt % of colloidal silica and had a pH of 3.27 in the form of a 10 wt % aqueous slurry at 25° C. Further, the solubility in water at 25° C. was as small as 0.03 g/100 ml.

EXAMPLE 3

Into a 5 l versatile mixer (made of stainless steel), 494 g (3.92 mol) of melamine (manufactured by Nissan Chemical Industries, Ltd.), 148 g (2.47 mol) of industrial granular urea (manufactured by Nissan Chemical Industries, Ltd.) and 21 g of precipitated silica (Carplex #80, registered trademark, manufactured by Shionogi Co., Ltd., silica content: 95 wt %, specific surface area: 193 $m^3/g$, primary particle size: 10 to 20 nm) were taken and mixed for 10 minutes. To this mixture of melamine, urea and colloidal silica, 443 g (orthophosphoric acid content: 3.84 mol) of an aqueous orthophosphoric acid solution containing 85 wt % of orthophosphoric acid (manufactured by TOSOH Corp.) was added and mixed over a period of 30 minutes with stirring. After completion of the addition, stirring was continued for further 30 minutes. The ratio of melamine was 1.02 mol per mol of orthophosphoric acid. By the addition of this aqueous orthophosphoric acid solution, remarkable heat-generation took place, and steam was generated, whereby 1,090 g of a wet powdery product was obtained.

Step (b)

The entire amount of 1,090 g of the product obtained in step (a) was put into a stainless steel vat and calcined at 250° C. by an electric furnace. The temperature raising time was about 2.5 hours, whereupon the temperature became 250° C. The calcining temperature of 250° C. was maintained for 12 hours. Slight agglomeration occurred due to dehydration, and in order to prevent such agglomeration, the product was taken out when the temperature of the product to be calcined reached 150° C., and the product in an agglomerated state was disintegrated, whereupon the calcination was continued. 805 g (theoretical amount: 811 g) of the calcined product was obtained.

By the calcination, no adhesion to the stainless steel vat or no corrosion of the stainless steel vat was observed.

With respect to the obtained calcined product, the elemental analysis was carried out, and the results were such that carbon was 17.0 wt %, nitrogen was 39.7 wt %, hydrogen was 4.8 wt %, and phosphorus was 14.5 wt %. As a result of the analysis of the silica content, the silica content was 2.3 wt %. Further, from these results, oxygen in the calcined product was calculated to be 21.7 wt %, and the ratio of oxygen atom was 2.90 mol per mol of phosphorus atom, which substantially agreed to the ratio (theoretical value) of oxygen atom being 3.0 mol per mol of phosphorus atom of polymetaphosphoric acid. The ratio of nitrogen atom was 2.00 mol per mol of carbon atom in the calcined product, which clearly agreed to the ratio (theoretical value) of nitrogen atom being 2.0 mol per mol of carbon atom of melamine. Further, the ratio of carbon atom was 3.03 mol per mol of phosphorus atom, and accordingly, the ratio of melamine was 1.01 mol per mol of phosphorus atom.

As a result of the differential thermal analysis, with the obtained product, no weight loss was observed up to 350° C., thus indicating excellent heat resistance.

The calcined product was crystalline. As a result of the powder X-ray diffraction, the diffraction peaks agreed to the diffraction peaks in Example 1, and no peak attributable to melamine orthophosphate, melamine pyrophosphate or melamine, was observed.

Thus, the obtained calcined product contained 97.7 wt % of melamine polymetaphosphate and 2.3 wt % of colloidal silica.

EXAMPLE 4

Into a 30 l polypropylene container equipped with a stirrer, 20.0 kg (orthophosphoric acid content: 173 mol) of an aqueous orthophosphoric acid solution containing 85 wt % of orthophosphoric acid (manufactured by TOSOH Corp.) was taken, and 2.19 kg (17.4 mol) of melamine (manufactured by Nissan Chemical Industries, Ltd.) was added and mixed thereto with stirring, followed by heating at a mixed liquid temperature of 80° C. for 2 hours to obtain 22.19 kg of an aqueous orthophosphoric acid solution having melamine dissolved therein. This solution contained 76.6 wt % of orthophosphoric acid and 9.87 wt % of melamine, and the ratio of melamine was 0.10 mol per mol of orthophosphoric acid.

Step (a)

Into a 200 l Henschel mixer (made of stainless steel) equipped with a jacket, 19.6 kg (156 mol) of melamine (manufactured by Nissan Chemical Industries, Ltd.), 5.0 kg (83.3 mol) of industrial granular urea (manufactured by Nissan Chemical Industries, Ltd.) and 1.1 kg of precipitated silica (Carplex #80, registered trademark, manufactured by Shionogi Co., Ltd., silica content: 95 wt %, specific surface area: 193 $m^3/g$, primary particle size: 10 to 20 nm) were taken and mixed for 5 minutes.

To this mixture of melamine, urea and colloidal silica, 19.9 kg (orthophosphoric acid content: 156 mol, melamine content: 15.6 mol) of the above-mentioned aqueous orthophosphoric acid solution having melamine dissolved therein, was added and mixed over a period of 20 minutes with stirring. After completion of the addition, stirring was further continued for 1 hour while heating by passing steam for heating through the jacket of the Henschel mixer, whereby 40.8 kg of a dry powdery product was obtained. The product had a composition wherein the ratio of melamine was 1.10 mol per mol of orthophosphoric acid.

Step (b)

The product obtained in step (a) was subjected to continuous calcination by a double-shaft type continuous screw conveyor kiln (made of stainless steel) at a jacket temperature of 340° C., with the temperature of the product to be calcined in the kiln being 290° C., for an average residence time of 4 hours. During the continuous calcination, no adhesion of the calcined product to the calcination furnace was observed, and after completion of the calcination, no corrosion by phosphoric acid was observed in the interior of the kiln.

31.8 kg (theoretical amount: 33.2 kg) of the calcined product was obtained. This calcined product was a powder having little hygroscopicity and excellent flowability and was readily pulverized by a pin-type mill.

The obtained pulverized product of the calcined product had powder properties such that the bulk density was 0.6 g/ml and the average particle size was 8.8 μm.

With respect to the obtained calcined product, the elemental analysis was carried out, and the results were such that the carbon was 17.0 wt %, nitrogen was 39.2 wt %, hydrogen was 4.4 wt %, and phosphorus was 14.5 wt %. As a result of the analysis of the silica content, the silica content was 3.1 wt %. Further, from these results, oxygen in the calcined product was calculated to be 21.8 wt %, and the ratio of oxygen atom was 2.91 mol per mol of phosphorus atom, which substantially agreed to the ratio (theoretical value) of oxygen atom being 3.0 mol per mol of phosphorus atom of polymetaphosphoric acid. The ratio of nitrogen atom was 1.98 mol per mol of carbon atom in the calcined product, which clearly agreed to the ratio (theoretical value) of nitrogen atom being 2.0 mol per mol of carbon atom of melamine. Further, the ratio of carbon atom was 3.03 mol per mol of phosphorus atom, and accordingly, the ratio of melamine was 1.01 mol per mol of phosphorus atom.

As a result of the differential thermal analysis, with the obtained product, no substantial weight loss was observed up to 350° C., thus indicating excellent heat resistance.

The calcined product was crystalline. As a result of the powder X-ray diffraction, the diffraction peaks agreed to the diffraction peaks in Example 1, and no peak attributable to melamine orthophosphate, melamine pyrophosphate or melamine was observed.

From the foregoing results, the calcined product obtained in step (b) was determined to be a mixture of a melamine polymetaphosphate and colloidal silica.

Thus, the obtained calcined product contained 96.9 wt % of melamine polymetaphosphate and 3.1 wt % of colloidal silica. It had a pH of 3.45 in the form of a 10 wt % aqueous slurry at 25° C. Further, the solubility in water at 25° C. was as small as 0.03 g/100 ml.

Figure 2:
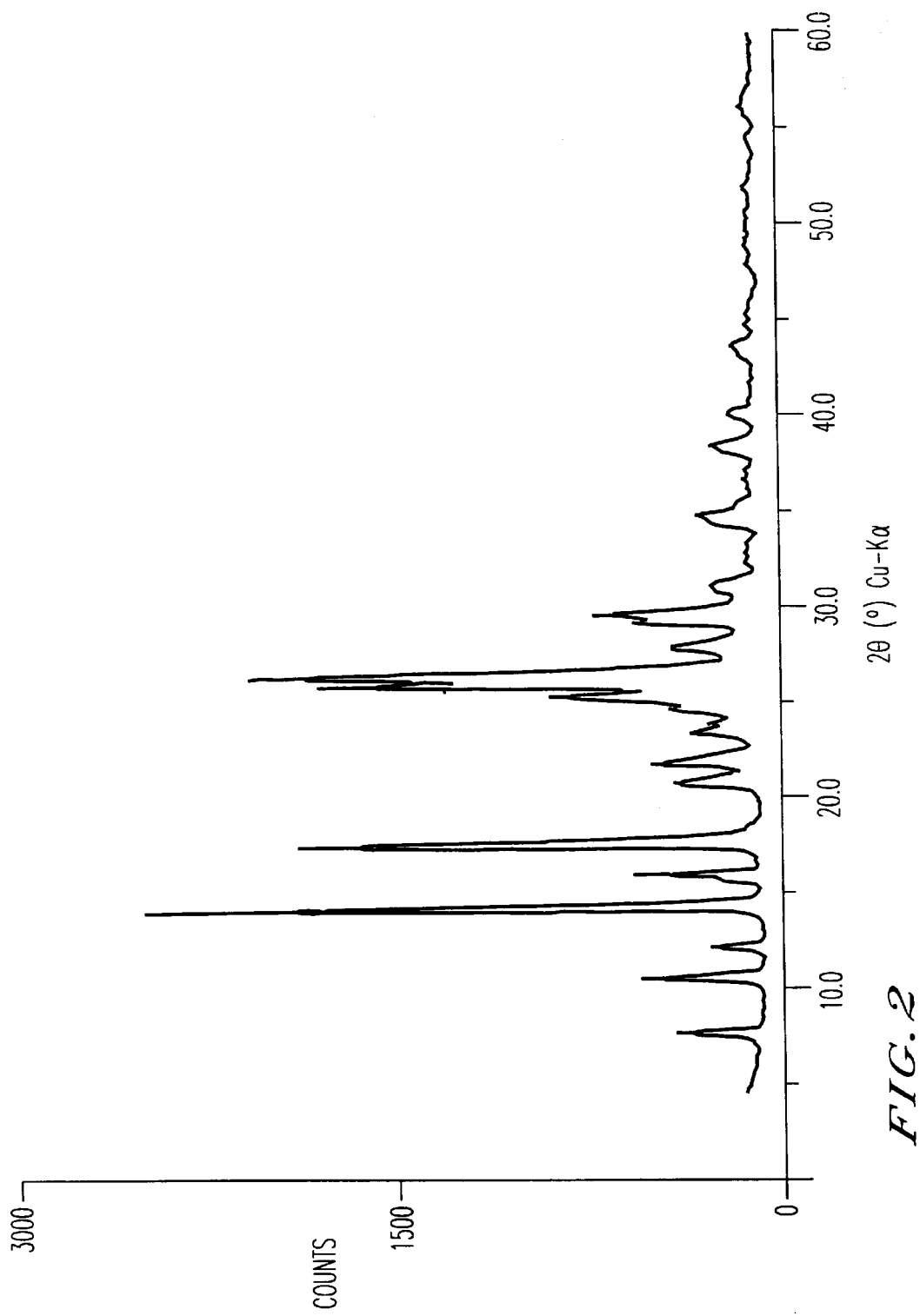
FIG. 2 is a powder X-ray diffraction pattern of a mixture of melamine polymetaphosphate and colloidal silica obtained in Example 4 (a product pulverized by a pin-type mill).

The results of the differential thermal analysis and the powder X-ray diffraction are shown in FIGS. 1 and 2, respectively. In the differential thermal analysis, the calcination residue at 1,000° C. was 10.4 wt %, which is attributable to silica phosphate glass ($SiO_2 \cdot P_2O_5$) formed by a reaction of colloidal silica with phosphoric acid.

EXAMPLE 5

To 23.0 kg of the calcined product obtained in step (b) in Example 4, 1.38 kg of magnesium hydroxide as an inorganic basic substance (Kisma 5, registered trademark, manufactured by Kyowa Chemical Industry Co., Ltd.) was mixed by a Henschel mixer, followed by pulverization and mixing by a pin-type mill.

The obtained pulverized product of the calcined product had powder properties such that the bulk density was 0.6 g/ml, and the average particle size was 10.0 μm.

The obtained calcined product contained 91.4 wt % of melamine polymetaphosphate, 2.9 wt % of colloidal silica and 5.7 wt % of magnesium hydroxide, and it had a pH of 7.31 in the form of a 10 wt % aqueous slurry at 25° C. Further, the solubility in water at 25° C. was as small as 0.02 g/100 ml.

As a result of the differential thermal analysis, no substantial weight loss was observed up to 350° C., thus indicating excellent heat resistance.

Comparative Example 4

Step (a)

Into a 10 l versatile mixer (made of stainless steel), 1,080 g (orthophosphoric acid content: 8.57 mol) of melamine (manufactured by Nissan Chemical Industries, Ltd.) was taken, and 886 g (7.68 mol) of an aqueous orthophosphoric acid solution containing 85 wt % of orthophosphoric acid (manufactured by TOSOH Corp.), was added and mixed over a period of 30 minutes with stirring. After completion of the addition, stirring was further continued for 30 minutes, whereby 1,930 g of a wet powdery product was obtained. The product had a composition in which the ratio of melamine was 1.11 mol per mol of orthophosphoric acid.

Step (b)

965 g of the product obtained in step (a) was put into a stainless steel vat and calcined at 290° C. by an electric furnace. The temperature raising time was about 4 hours, whereupon the temperature became 290° C. The calcining temperature of 290° C. was maintained for 5 hours. Slight agglomeration occurred due to dehydration, and in order to prevent agglomeration, the product was taken out when the temperature of the product to be calcined reached 150° C., and the product in an agglomerated state was disintegrated, whereupon the calcination was continued. 806 g of the calcined product was obtained. As a result of the powder X-ray diffraction, it was confirmed that melamine pyrophosphate was the main component, and a small amount of melamine polymetaphosphate was present.

Comparative Example 5

965 g of the product obtained in step (a) in Comparative Example 4 was put into a stainless steel vat and calcined at 310° C. by an electric furnace. The temperature raising time was about 4 hours, whereupon the temperature became 310° C., and the calcining temperature of 310° C. was maintained for 5 hours. Slight agglomeration occurred due to dehydration, and in order to prevent agglomeration, the product was taken out when the temperature of the product to be calcined reached 150° C., and the product in an agglomerated state was disintegrated, whereupon the calcination was continued. By the calcination, sublimation of melamine was remarkably observed. 740 g of the calcined product was obtained, but the surface was blackish due to polyphosphoric acid formed by calcination, and the calcined product substantially adhered to the stainless steel vat, and remarkable corrosion of the stainless steel vat was observed due to the polyphosphoric acid formed by dissociation of melamine from the melamine polyphosphate. The obtained calcined product contained free polyphosphoric acid, and the hygroscopicity was accordingly so large that it was hardly useful as a flame retardant. As a result of the powder x-ray diffraction, the calcined product was determined to be a melamine polymetaphosphate, but a shift was observed in the peak positions.

The obtained calcined product had a very low pH at a level of 2.0 in the form of a 10 wt % aqueous slurry at 25° C. Further, also in the differential thermal analysis, a weight loss due to dissociation of melamine at a temperature of 280° C. or higher was observed, and the weight loss at 350° C. was as high as 4.0%, thus indicating poor heat resistance.

Comparative Example 6

1,100 g of the wet powdery product obtained in step (a) in Example 2 was put into a stainless steel vat and calcined at 200° C. by an electric furnace. The temperature raising time was about 2 hours, whereupon the temperature became 200° C., and the calcination temperature of 200° C. was maintained for 5 hours. Slight agglomeration occurred due to dehydration, and in order to prevent such agglomeration, the product was taken out when the temperature of the product to be calcined reached 150° C., and the product in an agglomerated state was disintegrated, whereupon the calcination was continued. 920 g of the calcined product was obtained.

As a result of the powder X-ray diffraction, the diffraction peaks of the product agreed to the diffraction peaks of melamine pyrophosphate, and no formation of a melamine polymetaphosphate was observed.

The product obtained by the process of the present invention was confirmed to be a melamine polymetaphosphate (crystalline) by e.g. the elemental analysis, the powder X-ray diffraction and the differential thermal analysis.

As is different from conventional melamine polyphosphates or ammonium melamine polyphosphates, the melamine polymetaphosphate of the present invention has a solubility of at most 0.10 g/100 ml in water at 25° C., i.e. a solubility of from 0.02 to 0.03 g/100 ml in water at 25° C. as disclosed in the foregoing Examples, and it has a pH of from 2.5 to 4.5 in the form of a 10 wt % aqueous slurry at 25° C.

According to the process of the present invention, it is possible to produce the melamine polymetaphosphate efficiently by a simple operation of basically mixing and calcination. The melamine polymetaphosphate is excellent in the heat resistance and water resistance, as is different from conventional melamine phosphate, and it is also excellent in powder properties such as pulverizability, dispersibility and flowability and exhibits excellent flame retardancy due to a high phosphorus content.

The melamine polymetaphosphate of the present invention is useful as a flame retardant for a wide range of resins including a thermosetting resin such as a phenol resin, an epoxy resin, a polyurethane or an unsaturated polyester, a thermoplastic resin such as a polyamide, an aromatic polyamide, a polyethylene oxide, a polycarbonate, a polyolefin (such as polyethylene, polypropylene or polystyrene), a polyphenylene ether, a modified polyphenylene ether, a rubber-modified styrene acrylonitrile-butadiene-styrene (ABS), a polyester, a polysulfone, a polybutylene terephthalate or a polyvinyl chloride, and copolymers and alloys thereof. Further, it is useful as a flame retardant for molded products of such resins, resin-containing coating materials, adhesives, fibers or fiber products.

The melamine polymetaphosphate of the present invention may be used in combination with materials which are commonly used for the preparation of plastics, such as reinforcing agents such as glass fibers, carbon fibers or potassium titanate whiskers, heat stabilizers, photostabilizers, antioxidants, antistatic agents, pigments, fillers, lubricants, plasticizers or coupling agents. Further, the melamine polymetaphosphate of the present invention may be used in combination with other phosphorus type flame retardants or bromine type flame retardants.

Further, the melamine polymetaphosphate of the present invention may be used also as a stabilizer for resins, as an application other than as a flame retardant.

We claim:

1. A melamine metaphosphate having a solubility of from 0.01 to 0.10 g/100 ml in water at 25° C., a pH of from 2.5 to 4.5 in the form of a 10 wt. % aqueous slurry at 25° C. and a ratio of 6.0 to 6.6 gram atoms of nitrogen per one gram atom of phosphorus.

2. The melamine metaphosphate of claim 1, wherein the ratio of melamine to phosphorus in the metaphosphate ranges from 1.0 to 1.1 mol of melamine per one gram atom of phosphorus, the ratio of oxygen atoms to phosphorus atoms in the metaphosphate ranges from 3.0 gram atom of oxygen to one gram atom of phosphorus, the ratio of nitrogen atoms to carbon atoms in the metaphosphate ranges from 2.0 gram atoms of nitrogen to one gram atom of carbon and the ratio of carbon to phosphorus ranges from 3.0 to 3.3 gram atoms of carbon per one gram atom of phosphorus.

3. A process for producing a melamine metaphosphate as defined in claim 1, which comprises:
   (a) mixing melamine, urea and an aqueous orthophosphoric acid solution containing at least 40 wt % of orthophosphoric acid, in such a ratio that melamine is from 1.0 to 1.5 mol per mol of orthophosphoric acid and urea is from 0.1 to 1.5 mol per mol of orthophosphoric acid, at a temperature of from 0 to 140° C., to form a reaction mixture, and stirring the reaction mixture at a temperature of from 0 to 140° C., while removing water, to obtain a powdery product of a double salt of orthophosphoric acid with melamine and urea; and
   (b) a step of calcining the powdery product obtained in step (a) at a temperature of from 240 to 340° C. for from 0.1 to 30 hours, while preventing agglomeration, to obtain a melamine metaphosphate.

4. A process for producing a melamine polymetaphosphate as defined in claim 1, which comprises the following steps (a) and (b):
   (a) a step of mixing melamine, urea and an aqueous orthophosphoric acid solution containing at least 40 wt % of orthophosphoric acid, in such a ratio that melamine is from 1.0 to 1.5 mol per mol of orthophosphoric acid and urea is from 0.1 to 1.5 mol per mol of orthophosphoric acid, at a temperature of from 0 to 140° C., to form a reaction mixture, and stirring the reaction mixture at a temperature of from 0 to 140° C., while removing water, to obtain a powdery product of a double salt of orthophosphoric acid with melamine and urea; and
   (b) a step of incorporating colloidal silica to the powdery product obtained in step (a) in an amount of at most 16 parts by weight of the colloidal silica per 100 parts by weight of the melamine content of the powdery product, and calcining the powdery product at a temperature of from 240 to 340° C. for from 0.1 to 30 hours, while preventing agglomeration, to obtain a melamine polymetaphosphate.

* * * * *